Sept. 9, 1958  J. TOSELLO  2,851,248
STAKE SETTING MECHANISM
Filed Jan. 8, 1952  2 Sheets-Sheet 1
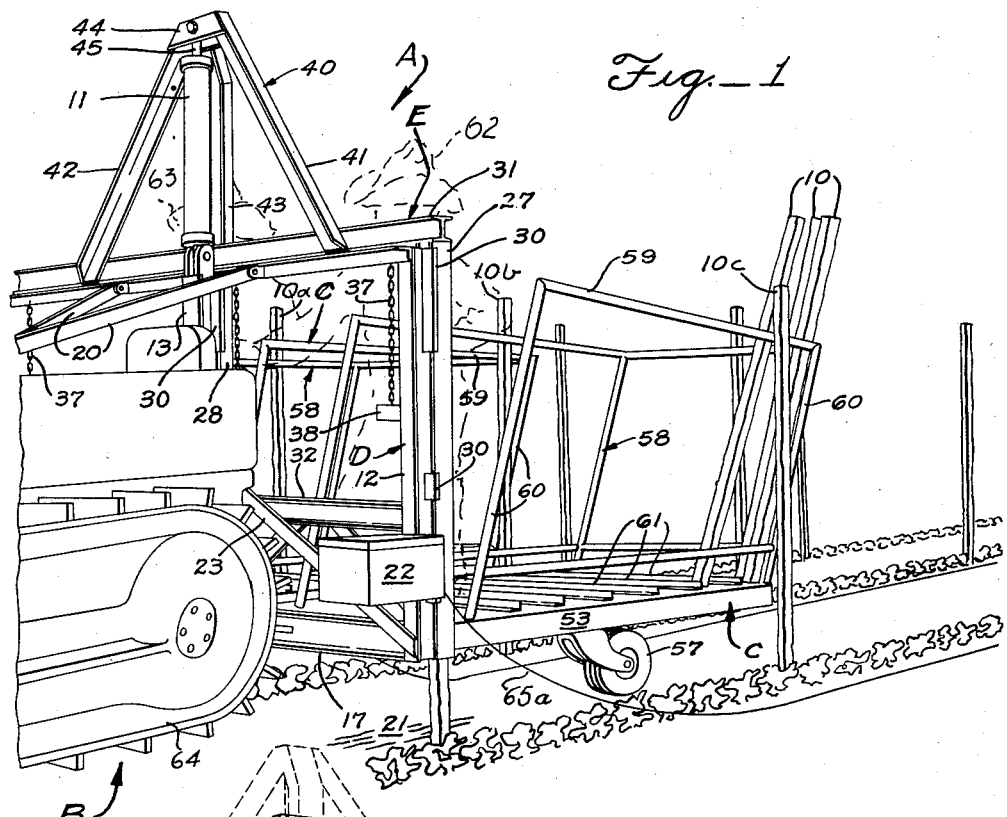
Fig._1
Fig._2
INVENTOR.
JOSEPH TOSELLO
BY
Leslie M. Hansen
ATTORNEY

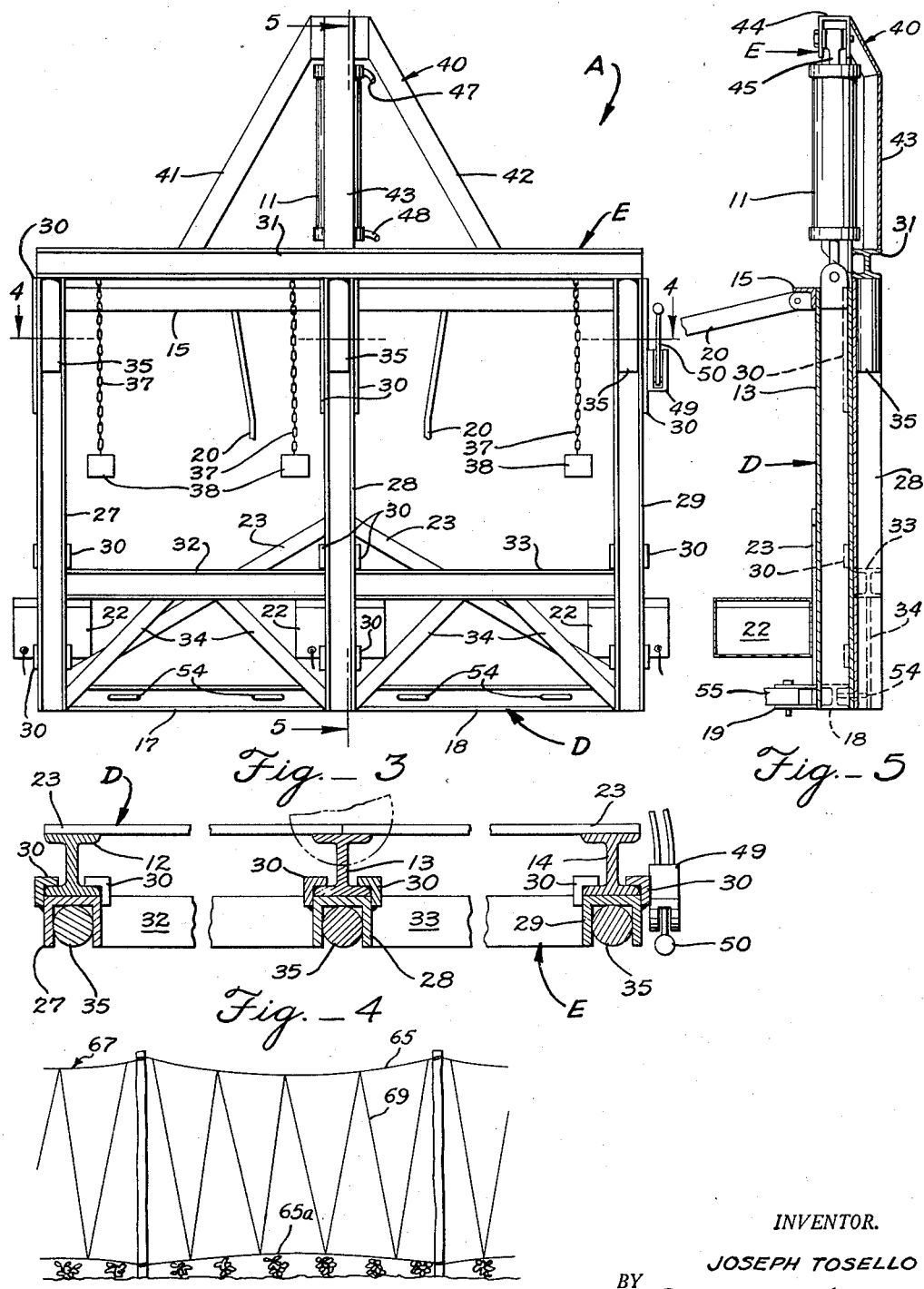

United States Patent Office 2,851,248
Patented Sept. 9, 1958

2,851,248

STAKE SETTING MECHANISM

Joseph Tosello, San Jose, Calif., assignor to Mission Valley Canning Co., Inc., San Jose, Calif., a corporation of California Application January 8, 1952, Serial No. 265,519

6 Claims. (Cl. 254—29)

The present invention relates to stake setting mechanism, and pertains more particularly to a device for setting pluralities of stakes in laterally spaced arrangement, at intervals along a field.

In the raising of some vine crops, such as green beans, or string beans, it is necessary to provide some form of support upon which the vines can grow in order to keep the vines from forming a tangled mass upon the ground. It is common practice, in many localities where such crops are grown, to provide stakes approximately one inch square and seven or eight feet long for supporting the vines. One of such stakes usually is provided for each plant and the stakes are set shortly after the plants have emerged from the ground. The stakes usually are driven into the ground by workers supplied with setting mauls.

To support these stakes against leaning under the weight of the plants when they have matured, it is common practice to tie the upper ends of adjacent stakes together by lengths of cord or twine extending both longitudinally and transversely of rows of young plants.

With this arrangement, when the plants are mature, they will have wound themselves around the stakes, and also will have followed along the tie cords which extend in both directions from their supporting stakes. As a result of such vine growth, the pickers are practically enclosed and roofed over by the vines which follow the cords extending transversely of the plant rows. This makes it very uncomfortable for the pickers, since they cannot work erect. It also makes it difficult to pick the portion of the crop growing thus overhead. When using the small, single plant stakes it is a difficult and costly procedure each year to set out the stakes and later to recover them from their encircling vines. Also, due to the small size of the stakes, a great number are broken each season. These factors make the provision, setting out and recovering of the small stakes a considerable factor in the cost of growing such crops.

The present invention contemplates the placing of rows of stakes of sufficient strength to support several vines each, a plurality of the stakes being set simultaneously. It is also a feature of the invention to set the stakes so as to eliminate the need for tying cords which extend transversely of the plant rows, so that the spaces between the rows will be open to facilitate picking the crop. Since some stakes may be slightly shorter than others, my invention also provides means for setting such shorter stakes with their upper ends disposed somewhat below the height of the standard length stakes. Means are provided for laying down a strand of twine along each row of stakes set by my invention to facilitate the making of a stranded trellis for supporting vines between adjacent stakes along the row of plants.

The foregoing and other objects and advantages of the invention will be apparent from the following description and the accompanying drawings, wherein:

Fig. 1 is a fragmentary perspective view showing the lefthand front portion of a stake setter embodying the present invention, being drawn along a row of young plants by a tractor, a pair of operators being shown in broken lines.

Fig. 2 is a lefthand rear perspective view of the assembly shown in Fig. 1, the vertically reciprocable stake setting frame being shown in solid lines in its lowered position, and in broken lines in its elevated position.

Fig. 3 is an enlarged rear elevational view of the stake setter shown in Figs. 1 and 2, the stake holding trailers being removed therefrom.

Fig. 4 is a transverse sectional view taken along line 4—4 of Fig. 3.

Fig. 5 is a vertical longitudinal sectional view taken along line 5—5 of Fig. 3.

Fig. 6 is a fragmentary side elevational view of a portion of a stranded trellis constructed along a row of stakes set as shown in Fig. 1.

Referring to the embodiment of the invention illustrated in the drawings, a stake setter A is mounted on the rear end of a tractor B. This arrangement is of course optional, since any suitable tractive means may be employed for moving the stake setter along the rows of plants, and it may, if desired, be mounted, in accordance with conventional structural principles, on a supporting vehicle of its own. The illustrated arrangement is preferred, however, since when the stake setter is not in use, it may be removed from the tractor to free the latter for other uses.

Two stake holding trailers C, C are attached to the rear of the stake setter A to transport a supply of stakes therewith. The trailers C, C are sufficiently narrow to pass freely between three laterally adjacent stakes 10a, 10b and 10c (Fig. 1) set by each operation of the device.

The stake setter A comprises a stationary frame D secured to the tractor B, and a vertically reciprocating frame E mounted for relative vertical slidable movement on the rear side of the stationary frame D. A hydraulic cylinder 11 controls the vertical movements of the reciprocating frame E.

The stationary frame D is formed of a plurality of structural steel members bolted or welded together, and comprises three upright frame members 12, 13 and 14 secured at their upper ends to an upper transverse frame member 15.

A pair of transverse frame members 17 and 18 are mounted to extend between the lower ends of the frame members 12 and 13, and the frame members 13 and 14, respectively. These transverse frame members are attached to the tractor by suitable attaching brackets 19 (Fig. 5). A pair of bracing bars 20, 20 extend diagonally downwardly and forwardly from the upper transverse frame member 15. The forward ends (not shown) of these diagonal brace members are secured to the tractor B.

The three upright frame members 12, 13 and 14 are mounted at a height to bring their lower ends well clear of the ground 21 when the device is mounted as shown in Figs. 1 and 2. Brace members 23, 23 extend diagonally upwardly and inwardly from the lower ends of the two outer upright frame members 12 and 14 (Fig. 3) to the central upright frame member 13.

A twine supply box 22 is mounted on the lower end of each of the three upright frame members 12, 13 and 14 and is arranged to pay out twine from a ball thereof, not shown, in each of the boxes 22, as the stake setting device A moves across a field during a stake setting operation.

The reciprocating frame E comprises three rearwardly open upright channel members 27, 28 and 29 mounted for vertical slidable movement on the rearward sides of the three upright frame members 12, 13 and 14, respectively, of the stationary frame D. Each of the upright frame members 27, 28 and 29 of the reciprocating frame E is slidably connected to its respective member of the fixed frame D by clips 30, to be free for vertical slidable movement relative thereto. The three upright members 27, 28 and 29 of the reciprocating frame E are secured at their upper ends to a transverse frame member 31.

Transverse frame members 32 and 33 also are secured in position between the upright frame members 27 and 28, and 28 and 29, respectively. The transverse frame members 32 and 33 are disposed upwardly from the lower ends of the upright members 27, 28 and 29, and diagonal bracing members 34 are secured to extend from the lower ends of these upright frame members to the transverse members 32 and 33.

Stake presser blocks 35, 35, 35 are secured in position within the upper end of each rearwardly open channel member 27, 28 and 29. Suspended on a chain 37 attached to the upper transverse frame member 31 of the reciprocating frame E adjacent each of the channels 27, 28 and 29 is an auxiliary presser block 38. These blocks are of substantially the same cross sectional size and shape as the presser blocks 35, 35, 35.

The chains 37 by which the auxiliary blocks 38 are suspended are of sufficient length to permit the auxiliary blocks to be inserted beneath the adjacent presser blocks 35, when it is desired to force a stake in the channel therebeneath deeper into the ground than would be the case if the auxiliary block were not employed. The auxiliary blocks are used for setting stakes which may be somewhat shorter than a minimum required length.

A triangular frame extension 40 is provided on top of the reciprocable frame E, and consists of a pair of converging diagonal frame members 41 and 42. An upright frame member 43 is provided centrally of this triangular extension 40, and a cap 44 is formed of welded steel plate to overlie the upper end of the piston rod 45 of the hydraulic cylinder 11. The lower end of the cylinder 11 is pivotally connected to the upper end of the stationary frame D.

Usual lines 47 and 48 for hydraulic liquid open into the upper and lower ends, respectively, of the cylinder 11, and are connected in a well known manner through a control valve 49 to a source, not shown, of pressurized fluid. A usual valve control lever 50 is mounted to control the flow of fluid to the cylinder. By manipulating the valve control handle to one adjusted position, for example, by moving it upwardly, hydraulic fluid can be admitted to the lower end of the cylinder 11 to raise the reciprocating frame E to its upper limit of movement, which may be determined by the stroke length of the cylinder 11. By moving the control handle 50 in a usual manner to other selected positions the movement of the reciprocating frame E may be arrested, or reversed, as required.

The trailers C, C are similar to each other, each comprising a bed 53 secured at its forward end by hook connectors 54, 54 to the transverse frame members 17 and 18. A single swiveled castored support wheel 57 is mounted beneath a rearward portion of each trailer bed. A rack frame 58, which may be of steel pipe, is provided with a forwardly open, U-shaped top bar 59 enclosing the sides and rear of the trailer. Uprights 60 of the rack frame 58 slope rearwardly, and the frame 58 is adapted to support a supply of the stakes 10 therein with their lower ends retained against slippage by cleats 61 secured to extend transversely of the trailer bed 53.

Two operators 62 and 63 (Fig. 1) ride one in each trailer C ahead of the supply of stakes 10 therein. One operator 62 manipulates two of the auxiliary presser blocks 38 when required, while the other operator 63 operates the other auxiliary presser block 38 when required, and also manipulates the valve control lever 50. By providing a spare pair of trailers C, while one pair of trailers is being used on the stake setting mechanism, the spare pair of trailers may be refilled and hauled to a point where they will be available when the towed trailers C, C of the stake setting mechanism are empty. Then, by exchanging the empty trailers for the filled ones, a minimum of time will be lost from the stake setting operation.

In describing the operation of the invention, it will be assumed that the stake setter A is mounted on the rear end of the tractor B, and that the two trailers C, C are supplied with stakes as shown in Fig. 1. Also, that the operators 62 and 63 are in position in their respective trailers C, C.

The tractor operator, not shown, manipulates the assembly shown in Figs. 1 and 2 into position at a side of a field of young plants to be staked so that the tractor tracks 64 are directed along the spaces between selected rows of the plants. The tractor is driven forward until the stake receiving channels 27, 28 and 29 are over the spots where it is desired to set the initial stakes.

The tractor B then is halted, and, with the reciprocable frame E raised by the hydraulic cylinder 11 to its upper limit of movement, and stakes 10 held in each of the channels 27, 28 and 29 by the two operators 62 and 63, the operator 63 swings the valve control lever 50 to a position where the valve 49 will admit pressurized liquid to the upper end of the cylinder 11, thereby to lower the reciprocating frame E and force the stakes 10 in the channels 37, 38 and 39 into the ground.

If any of the stakes 10 being set are shorter than the others by an amount sufficient to require setting with their upper ends lower than the rest, and this is readily apparent by means of a visual comparison with the other stakes in the channels, the operator places the auxiliary presser block 35 dangling by its chain 37 adjacent thereto, into the channel above the stake 10 therein. This forces the stake beneath the auxiliary block into the ground with its upper end lower than the others by a distance equal to the length of the auxiliary block.

As each group of stakes it set, the operator 63 swings the valve control lever 50 to a position to elevate the sliding frame E, and at the same time signals the tractor driver to drive ahead. While the tractor is moving ahead the operators place a new supply of stakes in the channels 37, 38 and 39 so that when the tractor stops, for example, at a signal from the operator 63 at the next stake setting point, the sliding frame E may be actuated at once upon stopping, so as to set the stakes without unnecessary delay. Twine 65a from the boxes 22 pays out as the mechanism proceeds across the field, so that it is at once available for constructing a trellis 65 (Fig. 6). The trellis 65 shown is made by securing the twine 65a to the stakes 10 near their lower ends. A top wire 67 then is strung along the upper ends of the stakes 10 in each row thereof, being secured to the stakes in a well known manner. Upright cords 69 then are wound onto the top wire 67 and lower cord 65a in a well known manner.

The invention permits a field to be staked out rapidly and easily. By facilitating the use of a smaller number of larger diameter and more durable stakes than those normally used in staking out a bean field, it also reduces greatly the annual expense and loss incident to the large breakage of the smaller stakes, and the cost in setting them by hand.

The present invention also, by employing a staking arrangement which requires no transverse bracing twine, greatly facilitates the harvesting of the crop, since the spaces between the rows of plants remain open, with no vines growing across from one row of plants to the other to shut off a free circulation of air and to add to the difficulties and discomfort of the pickers.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

1. Bean field stake setting mechanism comprising a stationary frame constructed for mounting in upright position to extend transversely across the rear end of a supporting vehicle, a plurality of rearwardly open channel members mounted in laterally spaced relation for vertical reciprocation on the rear side of said frame, the separation between adjacent channels being equal to a desired separation between adjacent rows of stakes set therefrom, means connecting said channel members for simultaneous up and down movement on said frame, a presser element mounted in each of said channels for movement therewith, controlled hydraulic actuating means operatively connecting said frame to said channel members, reciprocably to move said channel members relative to said frame upon actuation of said hydraulic actuating means, and a stake supply trailer hingedly attached at its forward end to the stationary frame, to travel in the space rearwardly between each laterally adjacent pairs of stake receiving channels, said trailer having swiveled wheel support means mounted to move in trail, said trailer having a station at its forward end for an operator.

2. A stake setter for mounting on a vehicle, comprising a frame, means for mounting said frame in upright position on a vehicle, a plurality of channels, each of a size to receive a stake of predetermined size therein mounted in laterally spaced relation on said frame for upright positioning with the open side of each channel disposed to face rearwardly relative to the travel of a vehicle upon which the frame is mounted, a plurality of stake setting members, one of which is mounted to overlie and engage the top of a stake inserted in each of said channels, controlled power means mounted to lower the setting members in unison to drive the stakes in said channels into the ground, a stake supply rack of a width less than the spacing between adjacent channels, and means for removably attaching said stake supply rack between adjacent of said channels to extend rearwardly therefrom, whereby stakes set from said channels will be clear of the rack on a forward movement of the vehicle upon which the stake setter is mounted.

3. Bean field stake setting mechanism comprising a first frame, the elements of which are arranged in substantially co-planar relation, means for fixedly mounting said first frame in upright position transversely across the rear end of a transporting vehicle, a second frame substantially co-extensive with the first frame and mounted for vertical reciprocation on the rear side of said first frame, a plurality of rearwardly open, stake-receiving channels mounted in laterally spaced, upright position on the reciprocating frame for reciprocation therewith, said channels being rearwardly clear of vehicle carried elements, a setting element at an upper portion of each stake receiving channel, actuating means operable alternately to elevate said second frame to raise said setting elements above stake height to receive a stake of predetermined maximum length in each of said channels, said actuating means being further operable to lower said second frame to lower said setting elements to set stakes in said channels into the ground, and a stake supply trailer of less width than the lateral spacing between adjacent channels connected at its forward end to the upright frame, whereby each trailer is drawn by the transporting vehicle, upon a forward movement of the vehicle and the stake setting mechanism mounted thereon, between stakes set from within said adjacent channels.

4. An arrangement according to claim 3 wherein a station for an operator is provided at the forward end of each trailer.

5. A tractor-mounted bean field staking mechanism which comprises an upright support frame mounted transversely across the rear of a tractor, a series of upright, rearwardly-open stake receiving channel members mounted for vertical movement on the rear side of said frame in upright, substantially co-planar relation, said channels being spaced apart transversely of the length of a tractor upon which they are mounted by a distance equal to a desired spacing between rows of stakes set by the mechanism, a stake setting member mounted in the upper end of each channel for movement therewith and positioned to overlie and engage a stake positioned in its channel, means uniting the channels for concerted, simultaneous, up-and-down movement on said support frame, a stake carrying platform extending rearwardly between adjacent ones of said channels, and of a width less than the spacing between such adjacent channels whereby the platforms are clear of the space directly rearwardly of each channel, and controlled power drive means selectively to raise said channels and their setting members to receive a stake in each channel, and to lower said channels and their setting members to set the stakes in said channels into the ground.

6. A tractor mounted bean field staking mechanism which comprises an upright support frame mounted transversely across the rear of a tractor, a series of upright, rearwardly open stake receiving channel members mounted on the rear side of said frame in upright, substantially co-planar relation, said channels being spaced apart transversely of the length of a tractor upon which the channels are mounted by a distance equal to the desired spacing between rows of stakes set by the mechanism, a stake setting member mounted in the upper end of each channel and positioned to overlie and engage a stake positioned in its channel, stake carrying platform means extending rearwardly between adjacent channels and of a width less than the spacing between adjacent channels, and controlled power drive means for selectively raising said setting members to receive a stake in each channel, and for lowering said channels to drive the stakes in said channels into the ground.

References Cited in the file of this patent

UNITED STATES PATENTS

| 1,776,798 | Sloan | Sept. 30, 1930 |
| 2,244,899 | Smith | June 10, 1941 |
| 2,551,897 | Notestein | May 8, 1951 |
| 2,617,627 | Evonuk et al. | Nov. 11, 1952 |
| 2,634,092 | Linquist | Apr. 7, 1953 |
| 2,657,010 | Sabin et al. | Oct. 27, 1953 |